US007299276B1

(12) United States Patent
Strawn

(10) Patent No.: US 7,299,276 B1
(45) Date of Patent: Nov. 20, 2007

(54) TECHNIQUE FOR MONITORING HEALTH OF NETWORK DEVICE USING DATA FORMAT VERIFICATION

(75) Inventor: Gary Strawn, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 862 days.

(21) Appl. No.: 09/738,749

(22) Filed: Dec. 14, 2000

(51) Int. Cl.
*G06F 15/16* (2006.01)
*G06F 15/173* (2006.01)

(52) U.S. Cl. ...................... 709/224; 709/203; 709/217; 709/219; 709/223

(58) Field of Classification Search ................ 709/224, 709/105, 201, 203, 205, 217, 219, 223, 229, 709/232
See application file for complete search history.

(56) References Cited

U.S. PATENT DOCUMENTS 5,611,050 A * 3/1997 Theimer et al. ............ 709/223
6,061,695 A * 5/2000 Slivka et al. ............... 715/513
6,138,157 A * 10/2000 Welter et al. ............... 709/224
6,327,622 B1 * 12/2001 Jindal et al. ................ 709/228
6,477,483 B1 * 11/2002 Scarlat et al. ............... 709/224
6,662,217 B1 * 12/2003 Godfrey et al. ............. 709/219
2002/0188631 A1 * 12/2002 Tiemann et al. ............ 707/513

OTHER PUBLICATIONS

*Regular Expression Syntax*, Printed from website on Nov. 17, 2000, http://www.microsoft.com, 3 pages.
Alfred V. Aho, et al. "Compilers Principles, Techniques and Tools", Bell Telephone Laboratories, Inc., Addison-Wesley, 1986, 4 pages.
Steve Mansour, "A Tao of Regular Expressions," Printed from website on Mar. 6, 2001, http://www.jmason.org, 10 pages.

* cited by examiner

*Primary Examiner*—Zarni Maung
*Assistant Examiner*—Hassan Phillips
(74) *Attorney, Agent, or Firm*—Dean E. Wolf; Beyer Weaver LLP

(57) ABSTRACT

A technique is disclosed for determining a health status of a selected network device in a data network. A resource request is transmitted to the selected network device. Data including content information is then received from the network device in response to the resource request. At least a portion of the content information is verified by verifying at least one format of a selected portion of content information using format verification rules. The health status of the network device may then be determined based upon the results of the format verification.

35 Claims, 4 Drawing Sheets

TECHNIQUE FOR MONITORING HEALTH OF NETWORK DEVICE USING DATA FORMAT VERIFICATION

BACKGROUND OF THE INVENTION

1. Field of the Invention

The present invention relates generally to data networks and more specifically to a technique for monitoring the health of network device using data format verification.

2. Background

Many of today's Internet content providers such as, for example, Yahoo.com, utilize a load-balanced server system in order to quickly provide desired content to a plurality of different users at substantially the same time. A block diagram of a conventional load-balanced server system is illustrated in FIG. 1 of the drawings. As shown in FIG. 1, a load-balanced server system 110 may be used by a content provider to respond to data requests from client devices (such as client device 102) via the Internet 104. The load-balanced server system 110 includes a load balancing device 106 and a plurality of server devices 108. The load balancing device 106 may be configured to perform the functions of a virtual server. When the virtual server receives a data request from the client device 102, it forwards the request to an appropriate server in the server farm 108.

According to conventional techniques, each of the servers in the server farm is periodically probed in order to determine whether the server is healthy and is operating properly. Conventionally, there are a variety of tests which may be performed in order to determine the health or status of a particular server in the server farm. As shown in the example FIG. 1, health monitoring may be performed by a health monitoring agent or device **106*a*** to determine which servers are active and healthy. For example, a selected server may be pinged in order to verify that the selected server is on-line.

A more qualitative status check involves transmitting a HTTP request to a selected server, and analyzing the data of the server's response in order to determine the health of the selected server. For example, a health monitoring device may transmit an HTTP request to a selected server to thereby cause the server to transmit an HTTP response to the health monitoring device. The data from the HTTP response may then be analyzed to determine whether the selected server is healthy and functioning properly.

Typically, the health monitor knows what to request and only vaguely what kind of response to expect. For example, when verifying an HTTP reply, the HTTP reply codes can be checked for error values in the header portion of the HTTP response to determine the relative health or status of the server. However, the error codes can not be used to verify that the retrieved resource is completely valid.

According to an alternate technique, the HTTP request submitted by the health monitoring device includes a request for the selected server to transmit an HTTP response which includes static HTML data such as, for example, a static HTML page. When the health monitoring device receives the static HTML data, it may then perform content verification of the static HTML data to determine whether the selected server is functioning properly. Typically, content verification is performed by comparing the received static HTML data to preconfigured HTML data stored at the health monitoring device. Thus, for example, the health monitoring device may check the health of a selected server by submitting a request to the server to transmit a specific, static HTML page used for test purposes. If the server is healthy, it should be able to transmit the requested test HTML page to the health monitoring device. The health monitoring device expects to receive specific HTML data from the selected server in response to the health status request. Thus, when the health monitoring device receives the test HTML data from the selected server, it compares the received HTML data to preconfigured HTML data stored at the health monitoring device to thereby verify the accuracy of the content of the test HTML page.

One problem with the above-described server health monitoring technique is that it does not allow verification of non-deterministic responses, such as CGI generated responses. Additionally, conventional server health monitoring techniques are ineffective when used to verify the contents of customized or dynamically generated data. One reason why a conventional health monitoring device is unable to perform this function is that the specific content of a customized or dynamically generated HTML page typically cannot be predetermined. Since the health monitoring device does not know the specific content which it expects to receive, it is unable to perform content verification, and is therefore unable to determine whether the server is functioning properly.

In order to partially overcome the above-described problems, conventional server health monitoring techniques have attempted to perform content verification of customized or dynamically generated HTML pages by checking for static content which is expected to be included in each requested HTML page. For example, a content provider such as Yahoo.com may include the text "copyright Yahoo.com" on each customized or dynamically generated web page. Thus, when the health monitoring device requests, for example, a dynamically generated web page from a selected Yahoo server, it may determine the health of the server by verifying the static portion (e.g. "copyright Yahoo.com") of the content of the dynamically generated HTML page. However, this modified technique of server health verification remains ineffective for verifying non-deterministic data such as customized or dynamically generated data.

While conventional techniques for monitoring the health of selected servers in a load-balanced server system have improved, there currently exists a number of problems which still need to be addresses. Accordingly, there exists a continual need to improve upon network device health monitoring techniques.

SUMMARY OF THE INVENTION

According to specific embodiments of the present invention, a method and computer program product are disclosed for determining a health status of a selected network device in a data network. A resource request is transmitted to the selected network device. Data including content information is then received from the network device in response to the resource request. At least a portion of the content information is verified by verifying at least one format of a selected portion of content information using format verification rules. According to a specific implementation, the format verification rules may include pre-defined regular expressions. Additionally, according to a specific implementation, verification of the content information may include determining whether any inconsistencies are detected in any of the formats of the selected content information being analyzed. The health status of the network device may then be determined based upon the results of the content verification.

Alternate embodiments of the present invention are directed to a method and computer program product for performing content verification of data received from a selected network device. The data received from the selected network device includes content information. At least a portion of the content information is verified by verifying at least one format of a selected portion of the content information using pre-defined format verification rules. In performing the content verification, a determination may be made as to whether any inconsistencies are detected in at least one format of the selected content information being analyzed.

Other embodiments of the present invention are directed to a method and computer program product for determining a health status of a selected network device in a data network. A resource request is transmitted to the selected network device. Data, including content information, is received from the network device in response to the resource request. At least one format of a selected portion of the content information is verified using format verification rules. According to a specific embodiment, the format verification includes determining whether there are any inconsistencies in any of the formats of the selected content information. Thereafter, the health status of the selected network device may be determined based upon the results of the format verification of the received data.

An alternate embodiment is directed to a system for determining a health status of a selected network device in a data network. The system comprises at lease one CPU, memory which is adapted to store format verification rules, and at least one interface for communicating with the selected network device. The system may be configured to transmit a resource request to the selected network device. The system may also be configured to receive data from the network device in response to the resource request. The received data may include content information. The system is also configured to verify at least a portion of the content information by verifying at least one format of a selected portion of the content information using the format verification rules. According to a specific implementation, the format verification rules may include pre-defined regular expressions. The system may further be configured to determine the health status of the network device based upon the results of the content verification analysis.

Another embodiment of the present invention is directed to a system for performing content verification of data received from a selected network device. The system comprises at least one CPU, memory adapted to store format verification rules, and at least one interface for communicating with the selected network device. The system is configured to receive data from the network device. The data may include content information such as, for example, HTML data. The system may be further configured to verify at least a portion of the content information by verifying at least one format of a selected portion of the content information using the format verification rules. The system may also be configured to determine whether any inconsistencies are detected in the formats of the selected content information being verified.

A different embodiment of the present invention is directed to a system for determining a health status of a selected network device in a data network. The system comprises at least one CPU, memory adapted to store format verification rules, and at least one interface for communicating with the selected network device. The system may be configured to transmit a resource request to the selected network device, and may be configured to receive data from the network device in response to the resource request. The data may include content information. The system may further be configured to verify at least one format of a selected portion of the content information using pre-determined format verification rules. The format verification may include determining whether any inconsistencies are detected in any of the formats of the selected content information being analyzed. The system may also be configured to determine whether the network device is functioning properly based upon the results of the format verification analysis.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

Figure 1:
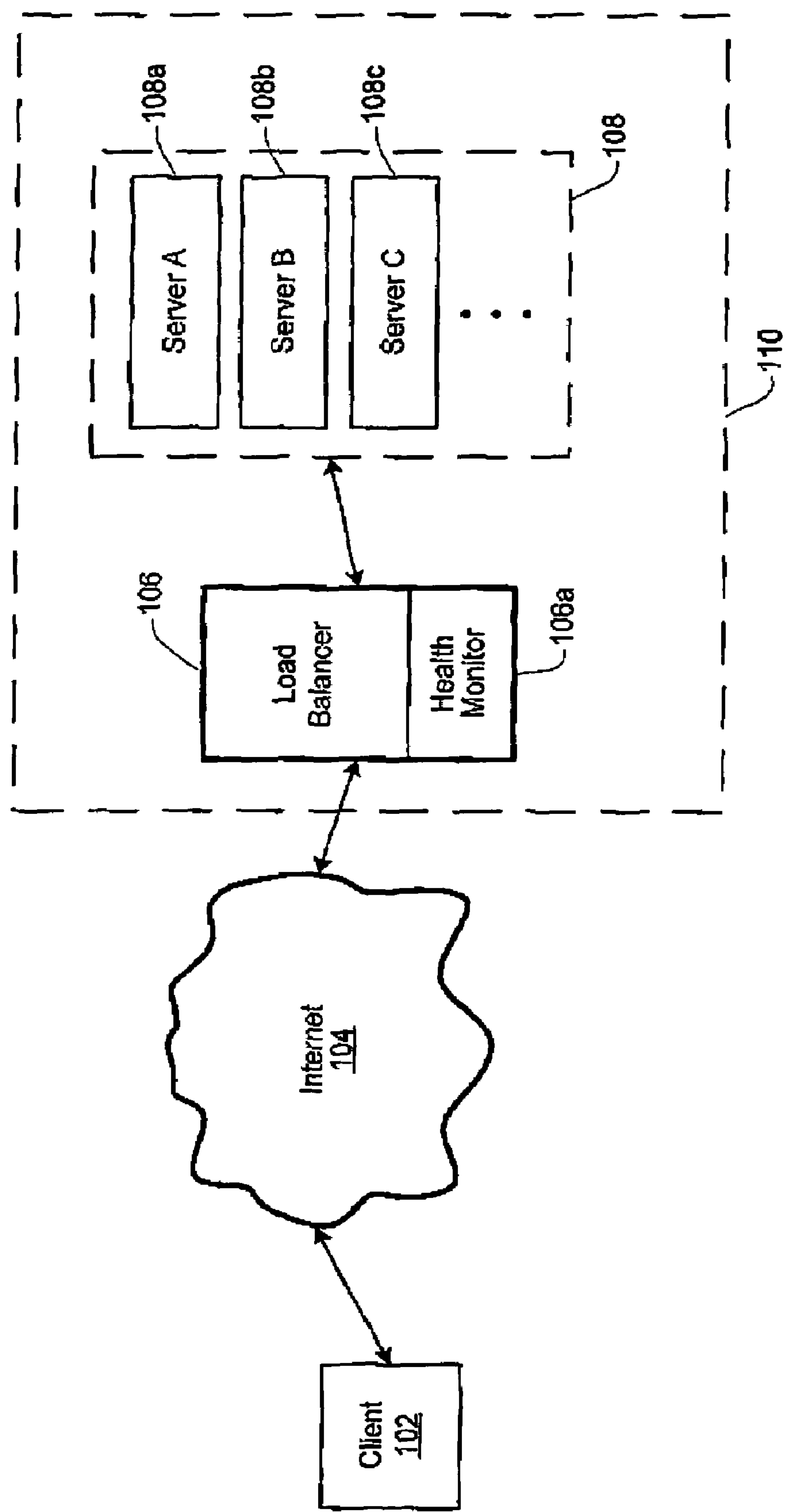
FIG. 1 shows a block diagram of a data network which may be used for implementing the technique of the present invention.
Figure 2:
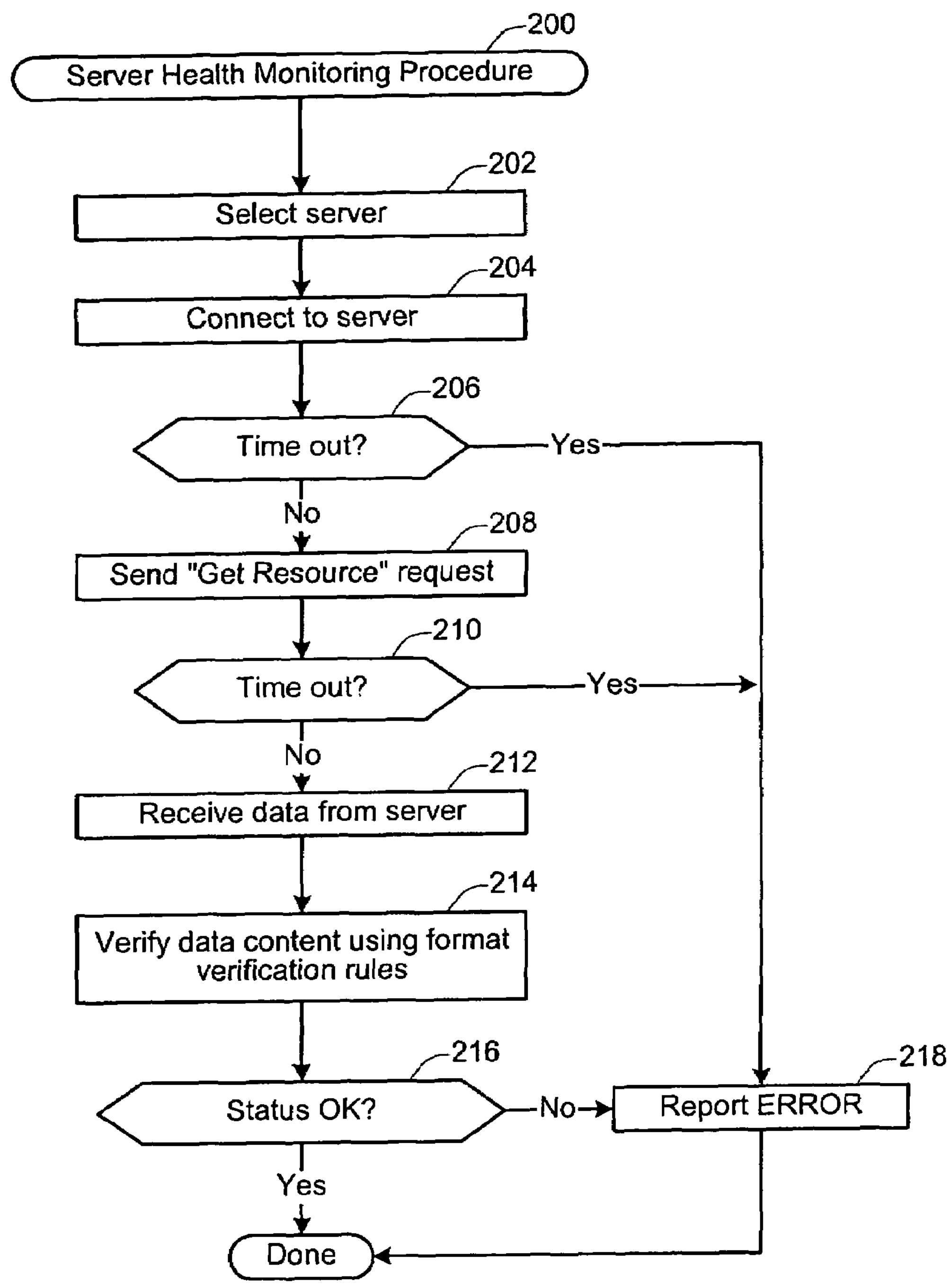
FIG. 2 shows a flow diagram of a Server Health Monitoring Procedure 200 in accordance with a specific embodiment of the present invention.

FIG. 2 shows a flow diagram of a Server Health Monitoring Procedure 200 in accordance with a specific embodiment of the present invention. According to a specific implementation, the Server Health Monitoring Procedure may be implemented by a health monitoring device or agent such as agent 106*a* of FIG. 1. It will be appreciated that the health monitoring technique of the present invention may be used to monitor the health of any network device which transmits data that conforms with a standardized or recognizable format. For purposes of illustration, it is assumed that the Server Health Monitoring Procedure 200 of FIG. 2 is used to monitor the health of a particular server (e.g. 106*a*) of the load-balanced server farm 110 of FIG. 1.

As shown at 202 of FIG. 2, a specific network device (e.g. Server A 108*a*, FIG. 1) is selected for health monitoring analysis. An attempt is then made (204) to connect to the selected server. If no connection to the server has been made within a first pre-determined time period (which may be a configurable parameter), then it may be determined (206) that the connection attempt to the server has timed out. Accordingly, the connection time out error is reported (218) to an appropriate location for handling.

Assuming that the health monitoring device establishes a connection to the selected server, the health monitoring device may then send (208) a "Get Resource" request to the selected server in order to retrieve desired data from the selected server relating to a desired file or resource to be analyzed to content or format verification. For example, the "Get Resource" request may include an HTTP request to receive data associated with a specific URL such as, for example, a URL corresponding to a specific web or HTML page. If the health monitoring device does not receive a response from the selected server within a second predetermined time period (which may be a configurable parameter), the health monitoring device may determine (210) that the "Get Resource" request has timed out. Accordingly, the Get Resource time out error is reported (218) to an appropriate location for handling.

At 212 it is assumed that a response from the selected server has been received at the health monitoring device. For example, the response may be an HTTP response which includes data such as, for example, HTML data, JPEG data, or other content information corresponding to the URL specified in the Get Resource request.

According to a specific embodiment, once the response to a Get Resource request has been received by the health monitoring device, content verification of the received data may be performed (214) by verifying the format(s) of all or a selected portion of the received data using pre-defined format verification rules. According to a specific implementation, verification of the received data using the pre-defined format verification rules may be accomplished by implementing the Content Verification Procedure 300 of FIG. 3 (described in greater detail below).

According to a specific embodiment, the pre-defined format verification rules may include regular expressions. As commonly known to one having ordinary skill in the art, regular expressions are patterns of text which may include ordinary characters (e.g. A-Z) and special characters known as metacharacters. A regular expression specifies a pattern which describes one or more strings to match when searching a body of text. Thus, for example, a regular expression may serve as a template for matching a character pattern to one or more strings which are located in the body of the text. A more detailed description of format verification using regular expressions is provided with respect to FIG. 3 of the drawings.

Using the results of the data content verification, a determination may then be made (216) as to whether the selected server is healthy or functioning properly. Assuming that there are no errors detected in the format of the received data, the health monitoring device may conclude that the selected server is healthy (e.g., functioning properly). Thereafter, the health monitoring device may select a different server or other network device for health monitoring analysis.

If, however, at least one error is detected in the format of the received data, the health monitoring device may conclude that the selected server is not healthy or is not functioning properly, and may then report (218) the error to an appropriate location for handling. According to a specific implementation, any errors detected by the health monitoring device may be reported to a user, system administrator, and/or another network device for handling. In one implementation, if an error has been reported for a selected server, that server may be taken off line.

According to a specific implementation, separate threads of the Server Health Monitoring Procedure may be implemented concurrently in order to monitor the health status of several network devices at the same time.

Figure 3:
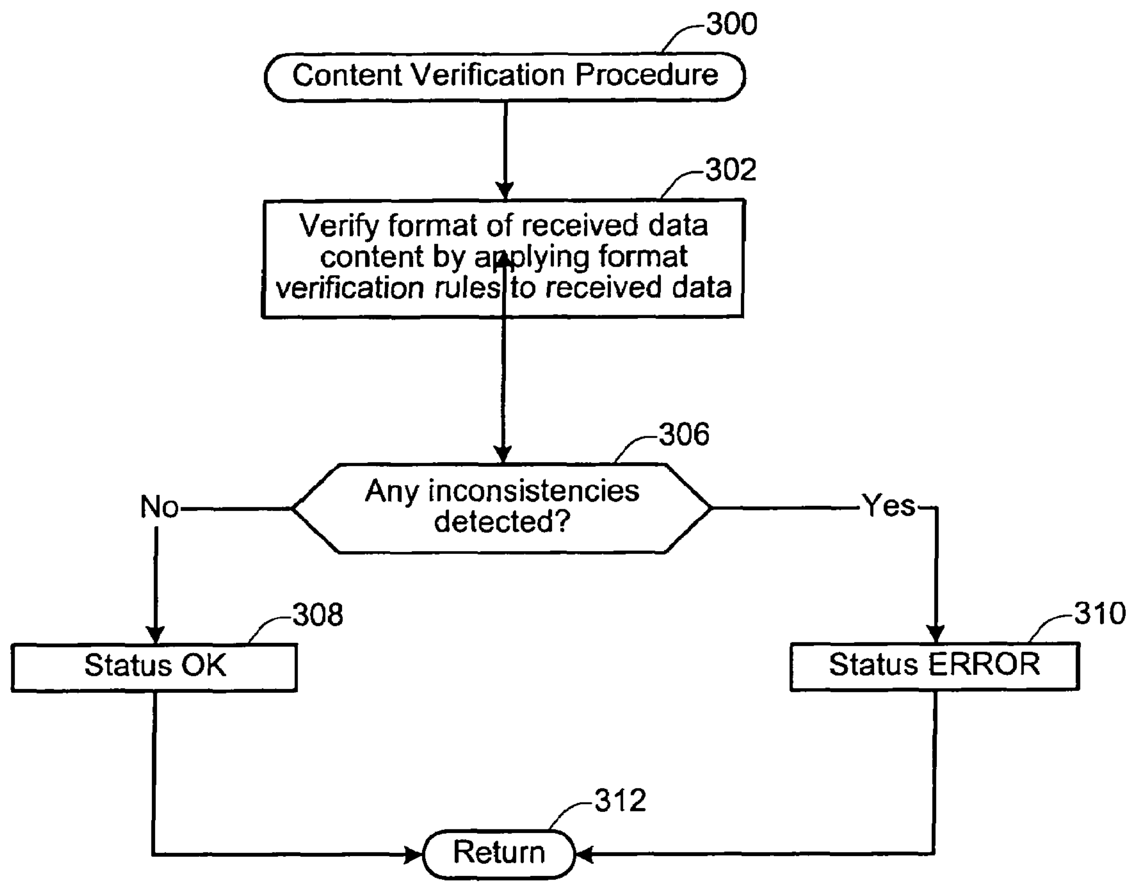
FIG. 3 shows a flow diagram of a Content Verification Procedure 300 in accordance with a specific embodiment of the present invention.

FIG. 3 shows a flow diagram of a Content Verification Procedure 300 in accordance with a specific embodiment of the present invention. According to one embodiment, the Content Verification Procedure 300 may be implemented by the health monitoring device during its verification of content of data received from a selected network device. As shown at 302 at FIG. 3, content verification is achieved using format verification, which may be performed on all or a selected portion of the received data by applying pre-defined format verification rules to the received data. According to a specific implementation, the format verification rules may be achieved using regular expressions. Examples of regular expressions are provided below.

When the health monitoring device receives a response form the selected server, it can use pre-defined regular expressions to determine whether or not the received response is valid by validating the format of the response data, rather than by validating the content of the actual data itself.

It will be appreciated that regular expressions are very flexible and powerful in their ability to verify a resource. Using regular expressions, a user is able to configure a health monitoring device to verify the format of non-deterministic data such as, for example, the customized or dynamically generated content data of any web page. In this way, content verification of a web page or other resource file may be performed without knowing what the actual content of the resource file should be.

According to a specific embodiment, regular expressions may be configured using an operating system command set language such as, for example, Cisco System's IOS command set. This provides for a simple user interface and allows configuration through a telnet or similar command-like connection.

Returning to FIG. 3, at 306 a determination is made as to whether any inconsistencies have been detected in the format verification analysis of the received data. If no inconsistencies have been detected, then the Content Verification Procedure 300 may return a "status OK" message (308). If, however, at least one inconsistency is detected in the format of the received data, the Content Verification Procedure may report a "status error" message (310). According to a specific implementation, any status message reported by the Content Verification Procedure may be reported to the Server Health Monitoring Procedure in order to allow the Server Health Monitoring Procedure to determine whether the selected server or network device is healthy and/or functioning properly.

ILLUSTRATIVE EXAMPLES

The following examples are intended to help provide the reader with a better understanding of the network device health monitoring technique of the present invention using format verification rules.

Example 1

In a first example, it is assumed that it is desired to perform a health monitor status check on a web server which returns a web page with the current time on it (herein referred to as a "current time" web page). In this first example, it is further assumed that the current time web page reports the time in the following format: HH:MM AM/PM, where HH denotes the hours portion of the current time, and MM denotes the minutes portion of the current time.

In this example, the web page is an HTML page which is dynamically generated by the server each time it receives a specific request for that page. Using conventional health monitoring techniques, it would not be possible for the health monitoring device to verify that a valid time was returned since the content of the web page is continuously changing. However, using the technique of the present invention, the health of the web server may be determined by verifying the format of the data of the current time web page. For example, the format of the time information of the requested web page may be verified using a regular expression, as shown below:

```
([1-9]|1[0-2]):[0-5][0-9](A|P)M                    (1)
```

Using the above regular expression as shown at (1), the time data of the current time web page must meet the following criteria in order to be validated. The hours portion of the time value (e.g., HH) must be an integer from 1 to 12, inclusive. This number must be followed by a colon. The minutes portion of the time value (e.g., MM) must then be a number from 0 to 59, inclusive. The time data string must then be followed by the characters "AM" or "PM".

Thus, for example, according to the regular expression defined in (1), the health monitoring device will validate a string such as "3:06 PM," but would not validate a data string such as "0:83 KM." If the health monitoring device determines that the format of the time data string is invalid, it will assume that the web server is not functioning properly, and will report an error to an appropriate device or location.

Example 2

In this second example, it is assumed that a web server is configured to return a web page which contains at least one stock symbol and its respective current dollar value. Using conventional health monitoring techniques, a simple text verification search can not be used to verify the content of this web page since there is no way to know what ticker symbol the user will request or what the corresponding dollar value will be. However, using the technique of the present invention, it is possible to validate the information returned by the server by validating the format of the returned data.

Thus, using the technique of the present invention, a health monitoring device is able to validate the information returned by the server by validating the format of at least a portion of the information. If there are no inconsistencies the format of the analyzed data, then the health monitoring device may conclude that the web server is healthy and functioning properly. An example of a regular expression which may be used to validate a stock symbol and dollar amount is shown below:

```
([A-Z]{1,4}|[A-Z]{4}X) ($(0|[1-9][0-9]*).[0-9]{2})                    (2)
```

In the example above, it is assumed that the web server will return a web page which includes a ticker symbol followed by the dollar price. According to the regular expression rules defined in (2), the ticker symbol must have a length of 1-4 characters, or must have a length of five characters with the last character being an "X." Further, the dollar value must include the dollar sign followed by a number which can be 0 or positive (but can not have leading zeros), followed by a decimal point, followed by two more numeric digits. Thus, for example, using the regular expression rules defined in (2), the health monitor would validate a string such as "CSCO $100.00", but would not validate a data string such as "CCSCO $1F".

It will be appreciated that one or more desired format verification rules may be applied to any given data string in order to verify the content of such data. For example, a Get Resource request from the health monitoring device may specify a specific web page which includes both a current time stamp and at least one stock ticker symbol. In this situation, both of the regular expressions (1) and (2) may be used to verify the format of the data corresponding to the requested web page.

A more detailed discussion of regular expressions and their use is provided in the book entitled "Compilers, Principles, Techniques, and Tools," by Alfred V. Aho, Bell Telephone Laboratories, Inc., 1988, which is incorporated herein by reference in its entirety for all purposes.

Other Embodiments

Generally, the network device health monitoring technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the network device health monitoring technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the network devices implementing this invention may be specially configured routers or servers such as specially configured router models 1600, 2500, 2600, 3600, 4500, 4700, 7200, 7500, and 12000 available from Cisco Systems, Inc. of San Jose, Calif., or may be specially configured switches such as the specially configured switch model Catalyst 6000, available from Cisco Systems, Inc. A general architecture for some of these machines will appear from the description given below. In an alternative embodiment, the network device health monitoring technique of this invention may be implemented on a general-purpose network host machine such as a personal computer or workstation. Further, the invention may be at least partially implemented on a card (e.g., an interface card) for a network device or a general-purpose computing device.

Figure 4:
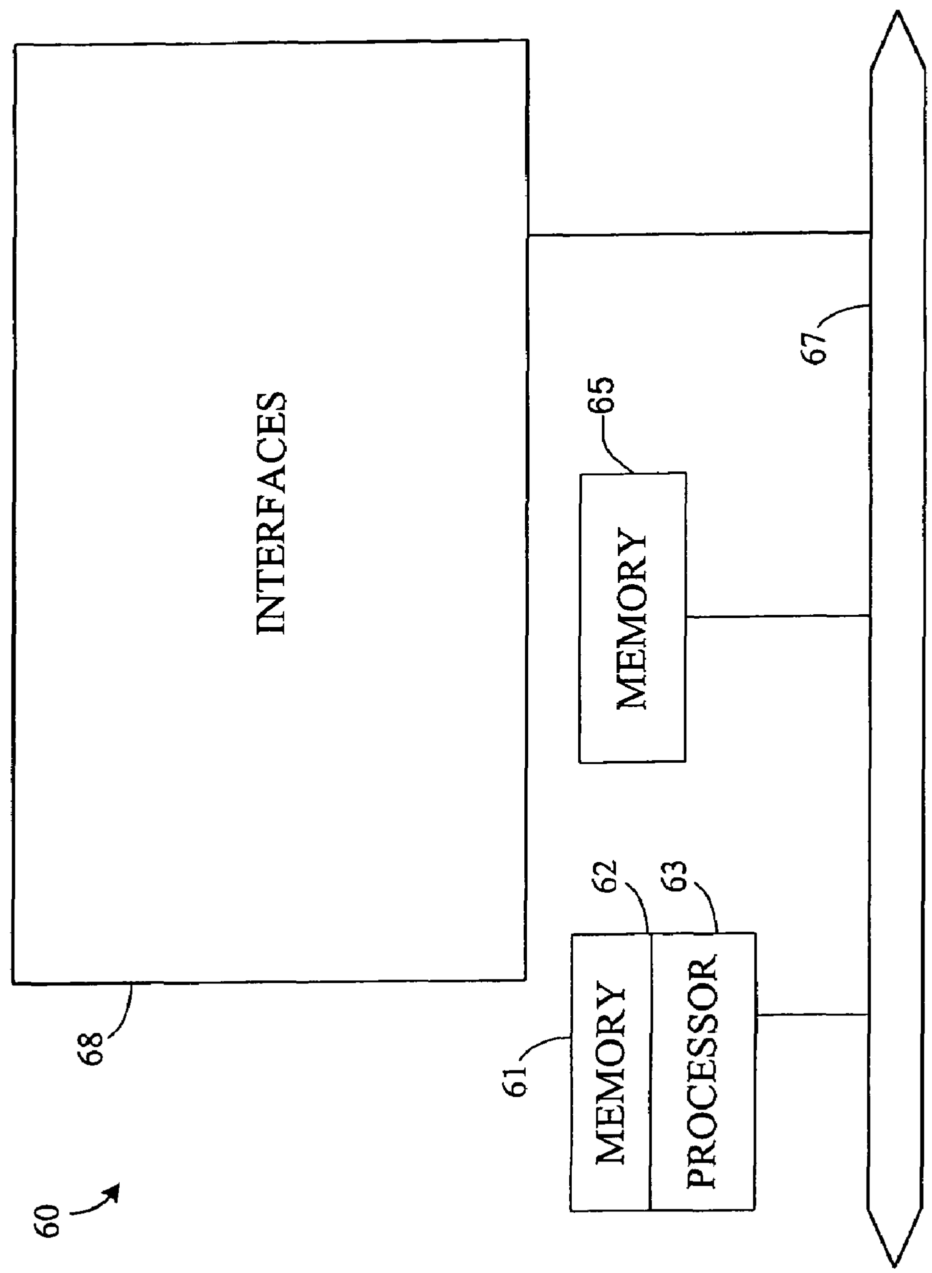
FIG. 4 shows a network device 60 suitable for implementing the network device health monitoring technique of the present invention.

Referring now to FIG. 4, a network device 60 suitable for implementing the network device health monitoring technique of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a load balancing device, the CPU 62 may be responsible for analyzing packets, encapsulating packets, forwarding packets to appropriate network devices, performing content and/or format verification of data, etc. The CPU 62 preferably accomplishes all these functions under the control of software including an operating system (e.g., Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 4 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the network device health monitoring technique described herein. The program instructions may control the operation of an operating system and/or one or more applications, for example. The memory or memories may also be configured to include data structures which store regular expressions and other format verification rules, content data received from selected network devices, etc.

Because such information and program instructions may be employed to implement the systems/methods described herein, the present invention relates to machine readable media that include program instructions, state information, etc. for performing various operations described herein. Examples of machine-readable media include, but are not limited to, storage media such as: magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in transmission media such as: a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A computer program product for determining a health status of a selected server of a server farm, the computer program product comprising:

a computer usable storage medium having computer readable code embodied therein, the computer readable code comprising:

computer code for implementing a first thread of said computer program product for determining the health status of a first server of the server farm, said first thread comprising:

computer code for identifying the first server of the server farm for analysis;

computer code for receiving data from the first server, said data including content information;

computer code for performing format verification on a first portion of said content information by verifying correct formatting of the first portion of content information using predetermined format verification rules;

computer code for identifying timestamp information in the first portion of content, wherein the timestamp information includes an hour's portion of a time value and a minute's portion of the time value;

computer code for determining whether the hour's portion of the time value is an integer within a range from 1 to 12, inclusive;

computer code for determining whether the minute's portion of the time value is an integer within a range from 0 to 59, inclusive;

computer code for determining whether the timestamp information includes a colon character interposed between the hours portion and minutes portion of the time value; and computer code for determining the health status of the first server based upon results of said format verification.

2. The computer program product of claim 1 wherein said format verification code further includes:

computer code for verifying correct formatting of the timestamp information using a first regular expression corresponding to: ([1-9]|1[0-2]):[0-5][0-9]).

3. The computer program product of claim 1 wherein said format verification code further includes:

computer code for verifying correct formatting of the timestamp information using a first regular expression corresponding to: (A|P)M.

4. The computer program product of claim 1 wherein said format verification code further includes:

computer code for identifying timestamp information in the first portion of content; and computer code for determining whether the timestamp information includes a time data string followed by the characters "AM" or "PM".

5. The computer program product of claim 1 wherein the timestamp information includes a first portion of non-deterministic data which can not be predetermined, the computer program product further comprising:

computer code for performing format verification on the first portion of non-deterministic data by verifying correct formatting of the first portion of non-deterministic data using predetermined format verification rules.

6. A computer program product for determining a health status of a selected server of a server farm, the computer program product comprising:

a computer usable storage medium having computer readable code embodied therein, the computer readable code comprising:

computer code for implementing a first thread of said computer program product for determining the health status of a first server of the server farm, said first thread comprising:

computer code for identifying the first server of the server farm for analysis;

computer code for receiving data from the first server, said data including content information;

computer code for performing format verification on a first portion of said content information by verifying correct formatting of the first portion of content information using predetermined format verification rules;

computer code for identifying a ticker symbol in the first portion of content;

computer code for determining whether a length of the ticker symbol is between 1-4 characters, inclusive; and computer code for determining the health status of the first server based upon results of said format verification.

7. The computer program product of claim 6 wherein said format verification code further includes:

computer code for verifying correct formatting of the ticker symbol using a first regular expression corresponding to: ([A-Z]{1,4}|[A-Z]{4}X).

8. The computer program product of claim 6 wherein said format verification code further includes:

computer code for identifying a ticker symbol in the first portion of content; and computer code for determining whether a length of the ticker symbol is five characters with the last character being an "X."

9. The computer program product of claim 6 wherein the ticker symbol includes a first portion of non-deterministic data which can not be predetermined, the computer program product further comprising:

computer code for performing format verification on the first portion of non-deterministic data by verifying correct formatting of the first portion of non-deterministic data using predetermined format verification rules.

10. A computer program product for determining a health status of a selected server of a server farm, the computer program product comprising:

a computer usable storage medium having computer readable code embodied therein, the computer readable code comprising:

computer code for implementing a first thread of said computer program product for determining the health status of a first server of the server farm, said first thread comprising:

computer code for identifying the first server of the server farm for analysis;

computer code for receiving data from the first server, said data including content information;

computer code for performing format verification on a first portion of said content information by verifying correct formatting of the first portion of content information using predetermined format verification rules;

computer code for identifying currency information in the first portion of content, wherein the currency information includes a monetary value;

computer code for determining whether the monetary value includes a dollar sign followed by a numerical value greater than or equal to zero, followed by a decimal point, followed by two numeric digits; and computer code for determining the health status of the first server based upon results of said format verification.

11. The computer program product of claim 10 wherein said format verification code further includes:

computer code for verifying correct formatting of the monetary value using a first regular expression corresponding to: ($(0|[1-9][0-9]*).[0-9]{2}).

12. The computer program product of claim 10 wherein the currency information includes a first portion of non-deterministic data which can not be predetermined, the computer program product further comprising:

computer code for performing format verification on the first portion of non-deterministic data by verifying correct formatting of the first portion of non-deterministic data using predetermined format verification rules.

13. A computer program product for determining a health status of a selected server of a server farm, the computer program product comprising:

a computer usable storage medium having computer readable code embodied therein, the computer readable code comprising:

computer code for implementing a first thread of a process for determining the health status of a first server of the server farm, said first thread comprising:

computer code for identifying the first server of the server farm for analysis;

computer code for receiving data from the first server, said data including content information comprising a first portion of non-deterministic data which cannot be predetermined;

computer code for performing format verification on the first portion of non-deterministic data by verifying correct formatting of the first portion of non-deterministic data using predetermined format verification rules, the first portion of non-deterministic content including at least one type of information selected from a group consisting of: timestamp information including an hours portion of a time value and a minutes portion of the time value, currency information including a monetary value, and financial information including a ticker symbol; and computer code for determining the health status of the first server based upon results of said format verification.

14. The computer program product of claim 13 further comprising:

computer code for identifying timestamp information in the first portion of non-deterministic data, wherein the timestamp information includes an hour's portion of a time value and a minute's portion of the time value;

computer code for determining whether the hour's portion of the time value is an integer within a range from 1 to 12, inclusive;

computer code for determining whether the minutes portion of the time value is an integer within a range from 0 to 59, inclusive; and, computer code for determining whether the timestamp information includes a colon character interposed between the hour's portion and minute's portion of the time value.

15. The computer program product of claim 13 further comprising:

computer code for identifying timestamp information in the first portion of non-deterministic data; and computer code for determining whether the timestamp information includes a time data string followed by the characters "AM" or "PM".

16. The computer program product of claim 13 further comprising:

computer code for identifying a ticker symbol in the first portion of non-deterministic data; and computer code for determining whether a length of the ticker symbol is between 1-4 characters, inclusive.

17. The computer program product of claim 13 further comprising:

computer code for identifying a ticker symbol in the first portion of non-deterministic data; and computer code for determining whether a length of the ticker symbol is five characters with the last character being an "X."

18. The computer program product of claim 13 further comprising:

computer code for identifying currency information in the first portion of content, wherein the currency information includes a monetary value;

computer code for determining whether the monetary value includes a dollar sign followed by a numerical value greater than or equal to zero, followed by a decimal point, followed by two numeric digits; and computer code for determining the health status of the first server based upon results of said format verification.

19. The computer program product of claim 13 further comprising:

computer code for implementing, concurrently with the implementation of the first thread, a second thread of said computer program product for determining the health status of a second server of the server farm, said second thread comprising:

computer code for identifying the second server of the server farm for analysis;

computer code for receiving data from the second server, said data including a second portion of content information;

computer code for performing format verification on said second portion of content information by verifying proper formatting of the second portion of content information using a second set of predetermined format verification rules; and computer code for determining the health status of the second server based upon results of said second format verification.

20. The computer program product of claim 13 further comprising:

computer code for detecting, using results of said format verification, a problem relating to the health status of the first server; and computer code for automatically implementing at least one action in response to the detecting of the problem relating to the health status of the first server.

21. The computer program product of claim 13 wherein the selected first server is a selected server in a load balanced server farm system.

22. A system for determining a health status of a selected server of a server farm, the system comprising:

means for implementing a first thread of a process for determining the health status of a first server of the server farm, said first thread comprising:

means for identifying the first server of the server farm for analysis;

means for receiving data from the first server, said data including content information comprising a first portion of non-deterministic data which cannot be predetermined;

means for performing format verification on the first portion of non-deterministic data by verifying correct formatting of the first portion of non-deterministic data using predetermined format verification rules, the first portion of non-deterministic content including at least one type of information selected from a group consisting of: timestamp information including an hours portion of a time value and a minutes portion of the time value, currency information including a monetary value, and financial information including a ticker symbol; and means for determining the health status of the first server based upon results of said format verification.

23. The system of claim 22 further comprising:

means for identifying timestamp information in the first portion of non-deterministic data, wherein the timestamp information includes an hour's portion of a time value and a minute's portion of the time value;

means for determining whether the hour's portion of the time value is an integer within a range from 1 to 12, inclusive;

means for determining whether the minutes portion of the time value is an integer within a range from 0 to 59, inclusive; and means for determining whether the timestamp information includes a colon character interposed between the hour's portion and minute's portion of the time value.

24. The system of claim 22 further comprising:

means for identifying timestamp information in the first portion of non-deterministic data; and means for determining whether the timestamp information includes a time data string followed by the characters "AM" or "PM".

25. The system of claim 22 further comprising:

means for identifying a ticker symbol in the first portion of non-deterministic data; and means for determining whether a length of the ticker symbol is between 1-4 characters, inclusive.

26. The system of claim 22 further comprising:

means for identifying currency information in the first portion of content, wherein the currency information includes a monetary value;

means for determining whether the monetary value includes a dollar sign followed by a numerical value greater than or equal to zero, followed by a decimal point, followed by two numeric digits; and means for determining the health status of the first server based upon results of said format verification.

27. A method for determining a health status of a selected server of a server farm, the method comprising:

implementing a first thread of a process for determining the health status of a first server of the server farm, said first thread comprising:

identifying the first server of the server farm for analysis;

receiving data from the first server, said data including content information comprising a first portion of non-deterministic data which cannot be predetermined;

performing format verification on the first portion of non-deterministic data by verifying correct formatting of the first portion of non-deterministic data using predetermined format verification rules, the first portion of non-deterministic content including at least one type of information selected from a group consisting of: timestamp information including an hours portion of a time value and a minutes portion of the time value, currency information including a monetary value, and financial information including a ticker symbol; and determining the health status of the first server based upon results of said format verification.

28. The method of claim 27 further comprising:

identifying timestamp information in the first portion of non-deterministic data, wherein the timestamp information includes an hour's portion of a time value and a minute's portion of the time value;

determining whether the hour's portion of the time value is an integer within a range from 1 to 12, inclusive;

determining whether the minutes portion of the time value is an integer within a range from 0 to 59, inclusive;

determining whether the timestamp information includes a colon character interposed between the hour's portion and minute's portion of the time value.

29. The method of claim 27 further comprising:

identifying timestamp information in the first portion of non-deterministic data; and determining whether the timestamp information includes a time data string followed by the characters "AM" or "PM".

30. The method of claim 27 further comprising:

identifying a ticker symbol in the first portion of non-deterministic data; and determining whether a length of the ticker symbol is between 1-4 characters, inclusive.

31. The method of claim 27 further comprising:

identifying a ticker symbol in the first portion of non-deterministic data; and determining whether a length of the ticker symbol is five characters with the last character being an "X."

32. The method of claim 27 further comprising:

identifying currency information in the first portion of content, wherein the currency information includes a monetary value; and determining whether the monetary value includes a dollar sign followed by a numerical value greater than or equal to zero, followed by a decimal point, followed by two numeric digits.

33. The method of claim 27 further comprising:

implementing, concurrently with the implementation of the first thread, a second thread of said method for determining the health status of a second server of the server farm, said second thread comprising:

identifying the second server of the server farm for analysis;

receiving data from the second server, said data including a second portion of content information;

performing format verification on said second portion of content information by verifying proper formatting of the second portion of content information using a second set of predetermined format verification rules; and determining the health status of the second server based upon results of said second format verification.

34. The method of claim 27 further comprising:

detecting, using results of said format verification, a problem relating to the health status of the first server; and automatically implementing at least one action in response to the detecting of the problem relating to the health status of the first server.

35. The method of claim 27 wherein the selected first server is a selected server in a load balanced server farm system.

* * * * *